3,498,923
SURFACE-ACTIVE COMPOSITIONS AND METHOD FOR DISPLACING LIQUID ORGANIC FILMS FROM SOLID SURFACES
William A. Zisman, Silver Spring, Md., and Marianne K. Bernett, Washington, D.C., assignors to the United States of America as represented by the Secretary of the Navy
No Drawing. Filed Oct. 18, 1966, Ser. No. 588,260
Int. Cl. C11d 1/04, 3/18, 3/20
U.S. Cl. 252—171                                   9 Claims

ABSTRACT OF THE DISCLOSURE

A nonaqueous liquid surface-active composition for displacing liquid organic films from solid surfaces. The composition is a solution of a small amount of a partially fluorinated long-chain alkyl monocarboxylic acid in a solvent which may be an aliphatic naphtha of minimum flash point from about 108 to 140° F. or a low molecular weight dimethyl silicone.

---

The invention described herein may be manufactured and used by or for the Government of the United States of America for governmental purposes without the payment of any royalties thereon or therefor.

This invention relates to a method and compositions for surface-chemical displacing of liquid organic films from solid surfaces. The term film as used herein means a layer of an organic liquid which is physically adsorbed to a solid surface.

The usual procedures presently employed for removing oily films from solid surfaces of electrical, electronic or mechanical equipment involves spraying the solid surfaces with a solvent for the oily material or with an aqueous emulsion which contains a volatile solvent, a penetrant oil and a surface-active agent and functions through surface-chemical activity to displace the oily film.

The solvent film-removing procedure is simply a solvent-washing of the solid surface and depends essentially on the solubility of the oily material in the solvent.

The aqueous emulsion film-removing procedure requires spraying of the emulsion to the solid surface whereby the emulsion is broken on contact with the surface to release the penetrant oil which, with the assistance of the surface-active agent in the water emulsion, causes displacement of the oily film from the solid surface. The displacement of the oily film is followed by washing of the solid surface with water to remove residues of the oily film and of the applied emulsion. Optionally, the water-washing step is followed by spraying of a water-displacing composition to remove water from the washed surface.

The above prior art procedures require repeated spraying and, resultingly, the use of large amounts of the solvent or of the aqueous emulsion, as the case may be, to achieve a practical degree of displacement of the oily film from the solid surface. The aqueous emulsion procedure, additionally, has the disadvantage of introducing water which would prove detrimental or injurious in the cleaning of watches, meters and other fine mechanisms, optical equipment with sodium chloride windows, and electrical and electronic equipment containing parts which are damaged by water.

It is an object of the present invention to provide an improved surface chemical method of displacing liquid organic films from solid surfaces using nonaqueous liquid compositions.

It is a further object to provide nonaqueous, surface-active liquid compositions for displacing liquid organic films from solid surfaces.

The above and other objects are accomplished by the method of the present invention in which liquid organic films are displaced from solid surfaces by the application thereto of new liquid surface-active compositions which are nonaqueous organic solutions of a solute in a volatile solvent in which the solute and, in the one case, the solvent, also, by virtue of their molecular constitution, are active displacing agents. The new liquid compositions are also effective for displacing films of physically adsorbed water from solid surfaces.

The solutes for the liquid compositions of the invention are partially fluorinated aliphatic monocarboxylic acids of the formula:

$$F(CF_2)_m(CH_2)_nCOOH$$

wherein $m$ is an integer from 2 to 5 and $n$ is an integer from 10 to 16; for example, 11-(pentafluoroethyl) undecanoic acid, 11-(undecafluoropentyl) undecanoic acid, 17-(heptafluoropropyl) heptadecanoic acid, 17-(nonafluorobutyl) heptadecanoic acid, etc. The solute is used in small amounts, for example, from about 0.1 to 0.5% by weight of the liquid compositions.

The solvent for the liquid compositions of the invention may be an aliphatic naphtha of minimum flash point from about 108° F. to 140° F., for example, Amsco No. 140 Solvent, or a low molecular weight dimethyl silicone which is a liquid linear dimethyl silicone from the dimer to the octamer, of which the trimer is preferred. The dimethyl silicone solvent is an active displacing agent in the liquid compositions.

In the practice of the method of the invention, the new liquid surface-active compositions may be applied by various procedures to the solid surfaces from which a liquid organic film is to be displaced, such as by spraying or flushing with the compositions or by dipping or immersing the surfaces in a bath of the compositions, with or without ultrasonic agitation. Sprayed onto the solid surfaces, relatively small volumes of the liquid compositions will effectively displace liquid organic films from the surfaces, for example, a few cubic centimeters per 100 square inches of surface area.

The method of the invention is effective to displace any liquid organic film from solid surfaces, for example, films of aliphatic and aromatic hydrocarbon oils, liquid fatty acids, liquid alcohols, liquid esters and ketones, etc., from surfaces of solids such as metals, glass, resins and polymers. Particular applications of the method are in the cleaning of oily films from solid surfaces of electrical equipment, such as electric motors, electronic equipment, watches, meters and other fine mechanisms.

In a single operation, the method displaces the liquid organic film from the solid surface and deposits thereon a monolayer of the solute which prevents respreading of the displaced organic liquid over the solid surface for short or indefinite periods of time depending on the surface tension of the organic liquid which is displaced from the surface. Respreading will be prevented for long, indefinite periods in the case of displaced organic liquids which have a surface tension about 30 dynes/cm. at 20° C., such as mineral lubricating oils, whereas for displaced organic liquids which have a surface tension less than 30 dynes/cm. at 20° C., the period for which respreading is prevented will be short, from about 5 to 15 minutes. The rate of displacement of the liquid organic film from the solid surface will depend on the solvent and solute in the compositions and also on the organic liquid of the film to be displaced.

The volatile solvent in the new liquid compositions serves as a convenient means to distribute the solute rapidly over the solid surface, aids actively in displacing the liquid organic film from the surface when the solvent is a dimethyl silicone as above defined, and evaporates quickly leaving the surface dry and oil-and-water repellent. The solvent serves to reduce the quantity of the solute needed for the film-displacing operation.

The invention is further illustrated by the following specific examples of the new liquid surface-active compositions. Parts are by weight.

EXAMPLE 1

| | Percent |
|---|---|
| Aliphatic naphtha, 140° F. min. flash pt. | 99.7 |
| $F(CF_2)_2(CH_2)_{10}COOH$ | 0.3 |

EXAMPLE 2

| | |
|---|---|
| Aliphatic naptha, 140° F. min. flash pt. | 99.75 |
| $F(CF_2)_2(CF_2)_{16}COOH$ | 0.25 |

EXAMPLE 3

| | |
|---|---|
| Linear dimethyl silicone trimer | 99.7 |
| $F(CF_2)_2(CH_2)_{10}COOH$ | 0.3 |

Since the monolayers deposited by the liquid compositions of the invention are hydrophobic and oleophobic, the compositions can be applied as adhesives, e.g., mold-release agents, or as dust-repellents on metals, glass, resins and polymers. The deposited monolayers are effective in preventing or inhibiting subsequent corrosion of steel by the humid atmosphere.

While the invention has been described herein with reference to certain specific embodiments thereof, these are intended by way of illustration and not in limitation except as may be defined in the appended claims.

What is claimed and desired to be secured by Letters Patent of the United States is:

1. A nonaqueous liquid surface-active composition for displacing liquid organic films from solid surfaces which consists essentially of a solution of a small amount, from about 0.1 to 0.5% by weight, of a partially fluorinated aliphatic monocarboxylic acid of the formula:

$$F(CH_2)_m(CH_2)_nCOOH$$

wherein $m$ is an integer from 2 to 5 and $n$ is an integer from 10 to 16 in a volatile solvent selected from the group consisting of an aliphatic naphtha of minimum flash point from about 108° F. to 140° F. and a liquid linear dimethyl silicone from the dimer to the octamer.

2. A composition as defined in claim 1, wherein the solvent is an aliphatic naphtha of minimum flash point from about 108° F. to 140° F.

3. A composition as defined in claim 1, wherein the solvent is a liquid linear dimethyl silicone from the dimer to the octamer.

4. A composition as defined in claim 1, wherein the solvent is the liquid linear dimethyl silicone trimer.

5. A composition as defined in claim 1, wherein the solute is $F(CF_2)_2(CH_2)_{16}COOH$.

6. A composition as defined in claim 1, wherein the solute is $F(CF_2)_2(CH_2)_{10}COOH$.

7. A method of displacing liquid organic films from solid surfaces which comprises applying thereto a liquid surface active composition as defined in claim 1.

8. A method of displacing liquid organic films from solid surfaces as defined in claim 7, wherein the solute is $F(CF_2)_2(CH_2)_{16}COOH$.

9. A method of displacing liquid organic films from solid surfaces as defined in claim 7, wherein the solute is $F(CF_2)_2(CH_2)_{10}COOH$.

References Cited

UNITED STATES PATENTS

| | | | |
|---|---|---|---|
| 2,134,602 | 10/1938 | Cohen | 134—40 |
| 2,439,856 | 4/1948 | McGregor et al. | 260—448.2 |
| 2,491,843 | 12/1949 | Wilcock | 260—448.2 |
| 2,827,471 | 3/1958 | Gavlin et al. | 260—653 |

OTHER REFERENCES

Rochow: Chemistry of Silicones (1951), John Wiley & Sons, Inc. p 88.

LEON D. ROSDOL, Primary Examiner

W. SCHULZ, Assistant Examiner

U.S. Cl. X.R.

106—287; 134—40; 252—364